United States Patent [19]

Sanada

[11] Patent Number: 5,506,823

[45] Date of Patent: Apr. 9, 1996

[54] DATA RECORDING AND REPRODUCING METHODS

[75] Inventor: Shinji Sanada, Kanagawa, Japan

[73] Assignee: Sony Corporation, Tokyo, Japan

[21] Appl. No.: 351,815

[22] Filed: Dec. 8, 1994

Related U.S. Application Data

[62] Division of Ser. No. 195,858, Feb. 10, 1994.

[30] Foreign Application Priority Data

Feb. 24, 1993 [JP] Japan ................................. 5-059600

[51] Int. Cl.⁶ ....................................................... G11B 7/28
[52] U.S. Cl. ................................. 369/48; 369/32; 369/59
[58] Field of Search ................................. 369/54, 58, 48, 369/47, 49, 50, 53, 32, 33, 59

[56] References Cited

U.S. PATENT DOCUMENTS 5,060,219  10/1991  Lokhoff et al. ............................. 369/48
5,224,087   6/1993  Maeda et al. .............................. 369/54

Primary Examiner—Georgia Y. Epps
Assistant Examiner—P. W. Huber
Attorney, Agent, or Firm—Limbach & Limbach; Alan S. Hodes

[57] ABSTRACT

A digital data reproducing method is for reproducing data from a disc-shaped storage medium. Recorded on the disc-shaped recording medium is a designated reproducing unit size that is one of a plurality of possible reproducing unit sizes. The disc-shaped storage medium also has recorded thereon address information that includes repetitions of a plurality of sectors. The disc-shaped storage medium is rotated at a constant linear velocity and the designated reproducing unit size is reproduced from the disc-shaped storage medium. Then, data is reproduced from the disc-shaped storage medium in accordance with the address information and in increments of substantially the designated reproducing unit size such that each increment of data reproduced from the disc-shaped storage medium includes a plurality of sectors, including linking and data recording sectors. The designated data reproducing unit size is not greater than the number of repeated sectors of address information.

4 Claims, 18 Drawing Sheets

| VIRTUAL CLUSTER NO. | REAL CLUSTER NO. | SECTOR ADDRESS (IN UNITS OF 2 KILO-BYTES) |
|---|---|---|
| N | N(9)+0 | FC FD FE FF |
| N | N(9)+1 | 00 01 02 03 |
| N | N(9)+2 | 04 05 06 07 |
| N | N(9)+3 | 08 09 0A 0B |
| N | N(9)+4 | 0C 0D 0E 0F |
| N | N(9)+5 | 10 11 12 13 |
| N | N(9)+6 | 14 15 16 17 |
| N | N(9)+7 | 18 19 1A 1B |
| N | N(9)+8 | 1C 1D 1E 1F |

FIG. 12

| VIRTUAL CLUSTER NO. | REAL CLUSTER NO. | SECTOR ADDRESS (IN UNITS OF 4 KILO-BYTES) |
|---|---|---|
| N | N(7)+0 | FC FD FE FF 00 |
| N | N(7)+1 | 01 02 03 04 05 |
| N | N(7)+2 | 06 07 08 09 0A |
| N | N(7)+3 | 0B 0C 0D 0E 0F |
| N | N(7)+4 | 10 11 12 13 14 |
| N | N(7)+5 | 15 16 17 18 19 |
| N | N(7)+6 | 1A 1B 1C 1D 1E 1F |

FIG. 13

| VIRTUAL CLUSTER NO. | REAL CLUSTER NO. | SECTOR ADDRESS (IN UNITS OF 6 KILO-BYTES) |
|---|---|---|
| N | N(6)+0 | FC FD FE FF 00 01 |
| N | N(6)+1 | 02 03 04 05 06 07 |
| N | N(6)+2 | 08 09 0A 0B 0C 0D |
| N | N(6)+3 | 0E 0F 10 11 12 13 |
| N | N(6)+4 | 14 15 16 17 18 19 |
| N | N(6)+5 | 1A 1B 1C 1D 1E 1F |

FIG. 14

| VIRTUAL CLUSTER NO. | REAL CLUSTER NO. | SECTOR ADDRESS (IN UNITS OF 8 KILO-BYTES) |
|---|---|---|
| N | N(5) + 0 | FC FD FE FF 00 01 02 |
| N | N(5) + 1 | 03 04 05 06 07 08 09 |
| N | N(5) + 2 | 0A 0B 0C 0D 0E 0F 10 |
| N | N(5) + 3 | 11 12 13 14 15 16 17 |
| N | N(5) + 4 | 18 19 1A 1B 1C 1D 1E 1F |

FIG. 15

| VIRTUAL CLUSTER NO. | REAL CLUSTER NO. | SECTOR ADDRESS (IN UNITS OF 18 KILO-BYTES) | | | | | | | | | | |
|---|---|---|---|---|---|---|---|---|---|---|---|---|
| N | N(3)+0 | FC | FD | FE | FF | 00 | 01 | 02 | 03 | 04 | 05 | 06 | 07 |
| N | N(3)+1 | 08 | 09 | 0A | 0B | 0C | 0D | 0E | 0F | 10 | 11 | 12 | 13 |
| N | N(3)+2 | 14 | 15 | 16 | 17 | 18 | 19 | 1A | 1B | 1C | 1D | 1E | 1F |

FIG. 16
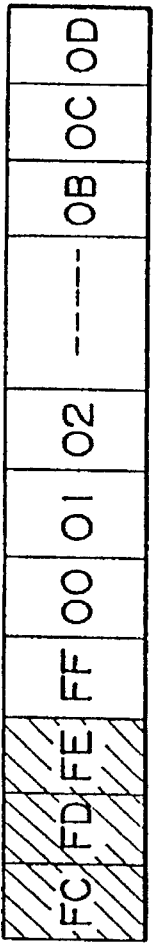
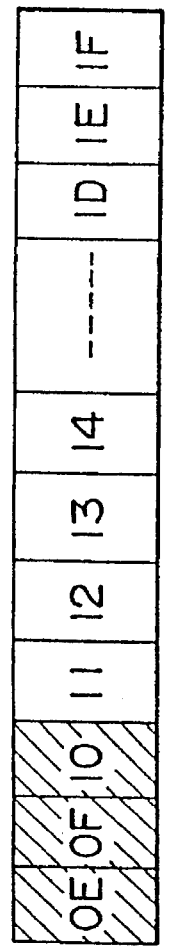
SECTOR ADDRESS
(IN UNITS OF 30 KILO-BYTES)
| VIRTUAL CLUSTER NO. | REAL CLUSTER NO. |
|---|---|
| N | N(2) + 0 |
| N | N(2) + 1 |

DATA RECORDING AND REPRODUCING METHODS

This is a divisional of application Ser. No. 08/195,858, filed Feb. 10, 1994.

BACKGROUND

1. Field of the Invention

The present invention relates to methods for recording and reproducing digital data. More particularly, the present invention relates to methods for recording and reproducing such digital data as computer data.

2. Background of the Invention

The applicant of this invention proposes a system that utilizes audio compression technology in recording and reproducing audio signals to and from a miniature optical disc, for up to 74 minutes.

FIG. 1 is a block diagram of a typical disc recording and reproducing system. Referring to FIG. 1, a disc cartridge 21 accommodates an optical disc 21B with a diameter of 64 mm. The optical disc 21B maybe one of three types: read-only optical disc, recordable magneto-optical disc, and hybrid disc containing both a read-only area and a recordable area.

Pre-grooves for optical spot control (i.e., for tracking control) are formed in advance on the optical disc 21B. In the example of FIG. 1, absolute address data is recorded in the pre-grooves multiplexed with the so-called wobbling signals used for tracking purposes. The absolute addresses will be described later in detail.

A spindle motor 22 rotates the optical disc 21B. The rotation of the spindle motor 22 is controlled by a servo control circuit 25. The spindle motor 22 rotates the optical disc 21 at a constant linear velocity.

The disc cartridge 21 has a shutter which opens when the cartridge is placed on a disc mounting tray and is loaded into the system. If the optical disc 21B is a recordable magneto-optical disc, a magnetic head 23 for recording is placed above the shutter of the disc. An optical pickup 24 is positioned immediately below the shutter of the disc 21B.

The optical pickup 24 has a light-emitting part and a light-receiving part. A feed motor 26 controls the movement of the optical pickup 24 in the radial direction over the optical disc 21B. The servo control circuit 25 provides focusing and tracking control of the optical pickup 24.

A system controller 20 incorporates a microcomputer to supervise the operation of the entire system. The system controller 20 is supplied to key input signals from a key group 10 including a playback key, a recording key, a pause key and a stop key.

A display unit 30 displays time data, such as the total playing time of the optical disc 21B currently loaded, the elapsed time of the piece of music currently being played, the remaining time of the piece of music currently being played, and the total remaining playing time of the disc. The display unit 30 also displays the track number and other data about the piece of music currently being reproduced. If the optical disc 21B-has a disc name and track names recorded thereon, the display unit 30 displays such information; if the optical disc 21B contains the time stamps representing the pieces of music or the disc itself, such data is also displayed on the display unit 30.

The signal recording and reproducing system of FIG. 1 is simply configured due to the use of integrated circuits. The relevant components of the system are switched in operation between recording and reproducing modes upon receipt of a mode switching signal from the system controller 20.

In recording mode, an analog audio signal is supplied to an input terminal 31. The audio signal is converted to a digital audio signal by an analog-to-digital converter 32 at a sampling frequency of 44.1 kHz using a 16-bit quantization scheme.

The digital audio signal is supplied to an audio compression encoding-decoding circuit 33. The audio compression encoding-decoding circuit 33 compresses the digital audio signal to be about ⅕ of its original size. The technology for audio signal compression employed in this example is modified DCT (Discrete Cosine Transform).

After compression by the audio compression encoding-decoding circuit 33, the digital audio signal is stored temporarily in a buffer memory 35 under control of memory controller 34. The buffer memory 35 in this example is a 1 Mbits DRAM.

Barring track jump of the recording position on the optical disc 21B during recording, the memory controller 34 reads out the compressed data consecutively from the buffer memory 35 at a transfer rate about five times as fast as the speed at which the compressed data is written into the buffer memory 34. The memory controller 34 provides the read-out data to a data encoding-decoding circuit 36.

If a track jump is detected during recording, the memory controller 34 suspends data transfer to the data encoding-decoding circuit 36 and instead accumulates in the buffer memory 35, the compressed data coming from the audio compression encoding-decoding circuit 33. After the recording position is corrected, the memory controller 34 resumes data transfer from the buffer memory 35 to the data encoding-decoding circuit 36.

Track jump occurrence is detected through the use of a vibrometer attached to the system. A vibration level exceeding a predetermined threshold level indicates the occurrence of a track jump. Alternatively, because the optical disc 21B has the absolute address data recorded in the pre-grooves, the absolute address data may be reproduced during recording and an output of the decoded data may be used to determine a track jump. If a track jump is detected, measures are taken to lower the output level of the light beam or to reduce the output level to zero. The recording position in effect upon a track jump may be corrected using the above-mentioned absolute address data.

During normal recording, if the amount of data placed in the buffer memory 35 exceeds a predetermined level, a predetermined quantity of data (e.g., 32 sectors of data, 1 sector being 1 CD-ROM sector or about 2 Kbytes) is read out from the buffer memory 35. This ensures at least a minimum writable memory space in the buffer memory 35.

The data encoding-decoding circuit 36 encodes the compressed data from the buffer memory 35 into data of the CD-ROM sector structure. In that case, 11 sound groups each composed of compressed audio data of 424 bytes are placed in two sectors. Thirty-six sectors including 32 sectors of compressed data and four linking sectors (for connecting cluster-unit data) constitute one cluster. Data is recorded or reproduced intermittently and always in units of clusters.

The output data from the data encoding-decoding circuit 36 (i.e., cluster-unit data) is supplied to an EFM-CIRC encoding-decoding circuit 37. The circuit 37 encodes data for error detection and correction and performs data modulation relevant to the recording (EFM (8–14 modulation) with this example). The code for error detection and correction used here is the ACIRC (Advanced Cross Interleave Reed-Solomon Code) with the modified interleave as opposed to the CIRC (Cross Interleave Reed-Solomon Code) for the compact disc.

FIG. 2 shows a typical structure of data to be recorded after encoding. Referring to FIG. 2, portions Ck, Ck+1, Ck+2, etc. represent compressed audio data (main data) in the k-th cluster, (k+1)st cluster, (k+2)nd cluster, etc., respectively. The recording data thus includes main data in units of 32 sectors B0 through B31 with four linking sectors L1 through L4 inserted between every two adjacent cluster units of main data. Where one cluster (i.e., k-th cluster) is to be recorded, what is detected and recorded here as the unit is, as shown in FIG. 2, a cluster composed of 36 sectors wherein three linking sectors are placed before the main data Ck including 32 sectors B0 through B31 followed by one linking sector.

As will be described later in detail, the cluster unit data is encoded for error correction using the ACIRC. The three linking sectors are provided for the following reason: during error correction in reproducing mode, an error can occur in a data junction between intermittently recorded, discontinuous cluster unit data. That error, if uncorrectable in nature, may propagate between cluster data, making data reproduction impossible. Two of the three linking sectors are intended to prevent such propagation of the uncorrectable error. The remaining one linking sector accomodates subdata.

In FIG. 2, the linking sectors before the data Ck includes two run-in block sectors L2 and L3 and one sub-data sector L4. The sub-data sector L4 is an undefined area at present. The sector L1 following the main data Ck of the cluster is a run-out block sector. Structured as described, the recording data is handled intermittently in units of 36 sectors. The four linking sectors are also used as areas which allow for the build-up of the magnetic field of the magnetic head 23 upon the start of intermittent recording and for synchronizing the light beam output level.

As shown in FIG.2, one sector is made of 2,352 bytes, including a 16-byte header. Each sector includes 5.5 sound groups (5.5 SG); thus two sectors constitute 11 sound groups. Although compressed audio data may be decoded in units of sound groups, two-channel stereo sound signals are reproduced correctly when decoded in units of 11 sound groups from two sectors.

The recording data thus prepared is supplied to the magnetic head 23 via a head driving circuit 38. The magnetic head 23 applies onto the optical disc 21B (magneto-optical disc in this case) a vertical magnetic field modulated according to the recording data. The optical pickup 24 irradiates a light beam to the optical disc 21B. During recording, the light beam of an output level higher than that required for reproduction is irradiated to the recording tracks of the optical disc 21B. The light beam irradiation and the vertical magnetic field modulated by the magnetic head 23 combine to record data onto the optical disc 21B thermomagnetically. The magnetic head 23 and the optical pickup 24 are arranged to move in synchronism in the radial direction of the optical disc 21B.

During recording, the output signal of the optical pickup 24 is supplied to an address decoder 40 via an RF amplifier 39. The process retrieves and decodes the absolute address data that was previously recorded in wobbling fashion in the pre-grooves along the tracks of the optical disc 21B. There are two kinds of absolute addresses: two-byte cluster addresses (cluster numbers) and one-byte sector addresses (sector numbers).

The absolute address data thus detected is supplied to the EFM-CIRC encoding-decoding circuit 37 which in turn inserts the address data into the recording data for recording onto the disc. The absolute address data is also supplied to the system controller 20 for recognition of the recording position as well as for position control.

The signal from the RF amplifier 39 is sent to the servo control circuit 25 which, also given the signal from the pre-grooves on the optical disc 21B, generates a servo control signal. The servo control signal is supplied to the spindle motor 22 to keep it revolving at a constant linear velocity.

In reproducing mode, as in recording mode, the servo control circuit 25 controls the revolutions of the spindle motor 22 to beat a constant linear velocity using the signal from the pre-grooves.

For reproduction, the optical pickup 24 detects the reflection of the light beam irradiated to the target track. In so doing, the optical pickup 24 detects a focusing error through astigmatism or a tracking error through the push-pull method. Furthermore, the optical pickup 24 detects the angle of polarization in the reflection from the target track, i.e., the difference of the Kerr rotation angle, in order to output a reproduced RF signal.

The output signal of the optical pickup 24 is supplied to the RF amplifier 39. From the output of the optical pickup 24, the RF amplifier 39 extracts a focusing error signal and a tracking error signal and supplies these signals to the servo control circuit 25. At the same time, the RF amplifier 39 puts the reproduced signal in binary format and sends it to the EFM-CIRC encoding-decoding circuit 37.

The servo control circuit 25 controls the optics of the optical pickup 24 to reduce the focusing error signal to zero. The servo control circuit 25 also controls the optics of the optical pickup 24 to bring the tracking error signal to zero.

The output of the RF amplifier 39 is sent to the address decoder 40. From the output of the RF amplifier 39, the address decoder 40 extracts the absolute address data from the pre-grooves and decodes the extracted data. The address decoder 40 supplies the system controller 20 with the absolute address data via the EFM-CIRC encoding-decoding circuit 37. Using the absolute address data supplied, the system controller 20 causes the servo control circuit 25 to control the reproducing position of the optical pickup 24 in the radial direction over the disc. The system controller 20 may also use sector unit address information extracted from the reproduced data in order to control the scanning position of the optical pickup 24 over the recording tracks.

In the reproducing mode, as will be described later, the compressed data read out from the optical disc 21B is written to the buffer memory 35 and is read therefrom and expanded. Because of the discrepancy in transmission rate between writing and reading of data to and from the buffer memory 35, it is necessary for the optical pickup 24 to read out data from the optical disc 21B intermittently so as to keep at least a minimum amount of data within the buffer memory 35.

For error correction, the EFM-CIRC encoding-decoding circuit 37 demodulates the EFM signal supplied from the RF amplifier 39. The output of the EFM-CIRC encoding-decoding circuit 37 is sent to the sector structure data encoding-decoding circuit 36. The circuit 36 decodes the received data from the CD-ROM sector structure back to the compressed data.

The output of the data encoding-decoding circuit 36 is stored temporarily in the buffer memory 35 via the memory controller 34. If there is no track jump caused by vibration or other disturbance during reproduction, i.e., if no dislodging of the reproducing position occurs, the memory controller 34 reads out the compressed data from the data encoding-decoding circuit 36 successively at a transfer rate about ⅕ of the write speed. The memory controller 34 then transfers the read-out data to the audio compression encoding-decoding circuit 33. At this time, the memory controller 34 controls the recording and reading of data to and from the buffer memory 35 so as to keep at least a minimum amount of data therein.

If a track jump is detected during reproduction, the memory controller 34 suspends the writing of data from the data encoding-decoding circuit 36 to the buffer memory 35, and only reads data from the buffer memory 35, transferring the real data to the audio compression encoding-decoding circuit 33. When the reproducing position is later corrected, the memory controller 34 resumes the writing of data from the circuit 36 to the buffer memory 35.

During normal operation, the memory controller 34 controls the buffer memory 35 so that it will accommodate at least a minimum amount of data. Illustratively, if the amount of data in the buffer memory 35 drops below a predetermined level, the memory controller 34 causes the optical pickup 24 to read out data intermittently from the optical disc 21B and causes data to be written from the data encoding-decoding circuit 36 to the buffer memory 35. In this manner, at least a minimum data read area is always provided in the buffer memory 35.

It takes about 0.9 seconds to fill the buffer memory 35 to capacity with data. This amount of data in the memory corresponds to about three seconds of uncompressed audio data. In other words, when the buffer memory 35 is filled completely with data, a disruption of the signal from the optical disc 21B does not prevent the reproduced signal from being output for about three more seconds. If the optical pickup 24 again accesses the proper position and reads the signal correctly therefrom during the three-second interval, this protects the analog audio signal as the reproduced output from becoming discontinued.

After decompression by the audio compression encoding-decoding circuit 33, the decompressed data is sent to a digital-to-analog converter 41. The digital-to-analog converter 41 generates an analog signal, from the decompressed data, that is output from an output terminal 42.

The innermost track of the optical disc 21B has a TOC (table of contents) area. On the optical disc 21B, the TOC area includes a PTOC to which nothing can be recorded by the user and a UTOC (user TOC) to which the user may record data. Recordable discs contain the UTOC for the purpose of managing the audio signals recorded thereon. On the optical disc 21B, the PTOC is recorded in advance in the form of pits whereas the UTOC, furnished outside the PTOC and inside the data area, serves as a recordable area to which the user may write data.

When the optical disc 21B is for audio purposes, the PTOC has codes (e.g., ASCII codes) recorded therein representing characters "MINI." The start and end addresses of each piece of music, the track names representing the pieces of music recorded, and the disc name identifying the disc are recorded in the PTOC on the read-only disc, or in the UTOC on the recordable disc.

When the disc is loaded into the system, the information in the PTOC and the UTOC is read therefrom and stored in a part of the buffer memory 35. Information in the UTOC may be modified at the time of recording, editing or the entry of a disc name or the name of a piece of music. Initiating any of these operations first updates the UTOC information held in part of the buffer memory 35. That is, the existing information is modified on the basis of the recorded audio data and the newly entered data. Then operating an eject key or a secondary power key (furnished apart from the main power key) causes the new UTOC information to be recorded into the UTOC area on the optical disc 21B.

The reasons for furnishing the linking sectors will now be described in detail. As described above, where data is recorded to and-read out from the disc, the ACIRC is used for error correction. This code is an improvement over the CIRC but provides basically the same error detection and correction processing as the CIRC.

The CIRC is not a block complete code but is, instead, a convolutional code. This can pose a major drawback during reproduction. For example, one portion of recorded data may be followed by another portion of new data recorded discontinuously over time but continuously in terms of recording positions (i.e., the physically preceding data is not necessarily the immediately recent data). In that case, the CIRC can develop a large burst error at the junction between these two portions of data during error correction and decoding for reproduction.

This aspect of the CIRC will now be elaborated on with the compact disc taken as an example. FIG. 3 schematically illustrates a compact disc signal recording and reproducing system especially relevant to the data recording and reproduction based on the CIRC. The two-stage Reed-Solomon code for use in the CIRC is composed of code series C1 and C2. For recording, digital audio data is supplied parallelly to a scrambling circuit 1 in units of 24 bytes (symbols). The data is rearranged by the scrambling circuit 1 and sent to a C2 encoder 2. The C2 encoder 2 generates a (28, 24, 5) Reed-Solomon code C2 of GF ($2^8$) which is supplemented by a four-byte (symbol) parity check code Q. Thus the C2 encoder 2 provides 28-byte (symbol) data that is supplied to an interleaving circuit 3. The interleaving circuit 3 interleaves (i.e., rearranges) the received data for a maximum interleaving length of 108 frames (one frame being equal to 32 bytes).

Next, a C1 encoder 4 generates a (32, 28, 5) Reed-Solomon code C1 of GF.($2^8$) which is supplemented by a four-byte (symbol) parity check code P. The C1 encoder 4 thus provides data in 32-byte (symbol) units (one 32-byte unit being called a frame). The data from the C1 encoder 4 is supplied to a recording-modulating circuit 5 that adds a sync signal to the data, subjects the resulting data to EFM, and converts the modulated data to serial data for recording onto a disc 6.

The data read out from the disc 6 by an optical head is put into binary format by an RF amplifier 7 and supplied to a reproducing-demodulating circuit 8. The reproducing-demodulating circuit 8 demodulates the EFM data and performs other related processes to convert the data to parallel data in units of frames (one frame being 32 bytes). The output of the reproducing-demodulating circuit 8 is sent to a error correcting and decoding circuit 10. The error correcting and decoding circuit 10 functionally includes a C1 decoder 11, a de-interleaving circuit 12, a C2 decoder 13 and a de-scrambling circuit 14.

It is possible to subject the Reed-Solomon code C1 to two-byte (symbol) error detection and correction. Then the C1 decoder 11 corrects correctable errors that may be detected. Downstream of the C1 decoder 11 is the de-interleaving circuit 12 that puts the data rearranged upon recording back into the originally ordered data. Thereafter, the C2 decoder 13 subjects the received data to the error correction and decoding based on the Reed-Solomon code C2 using the result of the error correction and decoding by the C1 decoder 11. Past the C2 decoder 13, the data is rearranged by the de-scrambling circuit 14 back to the original audio data for output as digital audio data.

In the reproducing section of FIG. 3, the binary output data of the RF amplifier 7 is a signal that repeats in units of frames each including 32 bytes (symbols), as shown in FIG. 4A. In FIG. 4A, each byte (symbol) is denoted in the format (m, n), m representing a frame number and n a byte unit number within the frame.

In practice, the error correcting and decoding circuit 10 rearranges in units of bytes the data in the memory as depicted in FIG. 4B. This is done to subject the data to the error detection and correction based on the two code series C1 and C2.

As shown in FIG. 4B, the code series C1 includes 32 bytes illustratively in a column including (1, 1), (1, 2), ..., (1, n), ... (1, 31) and (1, 32). The 32 bytes constitute one frame of data in the output signal from the RF amplifier 7. Of the 32 bytes, the last four bytes (1, 29), (1, 30), (1, 31) and (1, 32) make up the parity check code P. As mentioned, the code series C1 is suitable for two-byte error detection and correction.

Also shown in FIG. 4B in an oblique direction therein, the code series C2 includes 28 bytes illustratively including (−103, 1), (−99, 2), (−95, 3), ..., (−107+4n, n), ..., (1, 28). That is, of the data retrieved in the past, one byte in one of every four frames (one frame of data except for the parity check code P) is taken. Of the 28 bytes, 24 bytes are actually used as audio data and the remaining four bytes constitute the parity check code Q for error detection and correction. The code series C2 is also suitable for two-byte error detection and correction. When combined with an error pointer derived from the code series C1, the code series C2 allows for up to four bytes of erasure correction.

FIGS. 5 and 6 are flowcharts illustrating a typical conventional error detection and correction routine based on the code series C1 and C2. In step 101, parity calculation is made on the data of 32 bytes per frame in the code series C1 coming from the RF amplifier 7. In step 102, a check is made to see if an error exists in the data of the series C1. If no error is detected, step 103 is immediately reached. In step 103, an "OK" code is written as a pointer to each of the 28 bytes, each pointer indicating that the corresponding byte is free of error.

If an error is detected in step 102, step 104 is reached in which a check is made to see if the number of error bytes in the series C1 is smaller than the correctable error byte count, i.e., two bytes or fewer. If the result of the check in step 104 is positive, step 105 is reached in which the error is corrected. Step 105 is followed by step 103 in which an "OK" code is written to all pointers of the 28 bytes.

If the number of error bytes detected in step 104 is 3 or greater, the error is uncorrectable and step 106 is reached. In step 106, an "NG" code is written to all pointers of the 28 bytes, each NG-coded pointer indicating that the corresponding byte in error.

Step 103 or 106 is followed by step 107 of FIG. 6. In step 107, parity calculation is made on the code series C2 using the past data. In step 108, a check is made to see if the code series C2 contains an error.

If no error is detected in the code series C2, step 109 is immediately reached. In step 109, an "OK" code is written as a pointer to each of the 24 bytes in the series C2, and the 24 bytes are output as correct data.

If an error is detected in step 108, step 110 is reached. In step 110, a check is made to see if the number of error bytes E in the code series C2 is equal to or smaller than the correctable error byte count m (E≦m). In this case, the correctable number of error bytes is four because erasure correction is performed.

If the result of the check in step 110 is positive, step 110 is followed by step 111 in which the results (pointers) of the code series C1 are collated with the calculated results of the code series C2. A check is made in step 112 to see if the result of the collation shows that the error counts match between the two code series C1 and C2. Steps 111 and 112 constitute erroneous correction detecting means, i.e., means for checking to see if correct data is detected as an error.

If the result of the check in step 112 is positive, step 113 is reached for error correction of the code series C2. Step 113 is followed by step 109 in which an "OK" flag is attached to the entire 24-byte data of the code series C2, and the 24 bytes are output as correct data.

If the result of the check in step 112 is negative, i.e., if the detected number of error bytes fails to coincide with the number of "NG" pointers in the series C1, step 114 is reached. In step 114, an "NG" flag is written to the pointers of all 24 bytes of data in the code series C2, and the 24 bytes are output as error data.

If, in step 110, the parity calculation made on the code series C2 reveals that the detected number of error bytes E is greater than the correctable error byte count m, step 110 is followed by step 115. In step 115, a check is made to see if the number of error bytes containing "NG" pointers in the code series C2 is greater than the count m with reference to the result of parity calculation on the series C1.

If the number of error bytes is found to be smaller than the count m in step 115, the error detection of either the code series C1 or the code series C2 is considered erroneous. In that case, step 115 is followed by step 114 in which all 24 bytes of the code series C2 are deemed to contain the "NG" pointers, and all 24 bytes are output as error data.

If, in step 115, the number of data bytes having "NG" pointers is greater than the count m as a result of the reference to the series C1, that number is considered to match the result of parity calculation on the code series C2. In that case, step 115 is followed by step 116. In step 116, an "OK" or "NG" flag is written to each of the data bytes in accordance with the pointers resulting from the processing of the series C1, and the bytes with these flags are output as data.

At a later stage, the "OK-NG" flag scheme is used for data interpolation. That is, the bytes having "NG" flags are subject to average value interpolation or to a pre-hold technique for interpolation.

As described, the error detection and correction based on the code series C1 and C2 results in one of the following three kinds of error flag states regarding output data:

(1) No-error flag state (zero error as a result of the processing on the series C1 and C2)

(2) "OK-NG" mixed flag state (E>m for both C1 and C2)

(3) All-error flag state (a mismatch of the results of processing between C1 and C2)

With the above-described system performing error correction and detection based on the convolutional code signal processing, it may happen that one portion of previously recorded data is followed later by another portion of new data recorded. In that case, when the recorded data is rearranged in the memory into units of bytes as shown in FIG. 4B, FIG. 7A shows what happens at the junction between the two portions of data. As a result, as depicted in FIG. B, the junction entails a large area that may be considered erroneous.

More specifically, at the physical junction between two data portions, the clock signal of the previously recorded data is not in synchronism with that of the data recorded later. During reproduction, the asynchronism unlocks the PLL circuit for clock synchronization. As shown in FIG. 7B, about 300 bytes or 5 to 10 frames starting from the physical junction in question constitute a continuous error (called a hardware error) regarding the code series C1. When parity calculation is performed on the code series C2 and sections S1 through S5 are assumed at the junction as shown in FIG. 7B (each small circle indicating a data byte included in the series C2), the section S1 of the series C2 is regarded as a correctable error including one or two error bytes. Almost all of the errors of this kind are corrected with no problem. Even if an uncorrectable error were detected in this area, that error would be dealt with properly (e.g., by interpolation) with little difficulty.

However, at the section S2 of the code series C2 in FIG. 7B, with no error assumed outside the C1 error area illustrated, the number of error bytes is two as a result of the parity calculation on the code series C1 compared with the number of error bytes being 3 resulting from the parity calculation on the code series C2. The number of error bytes in the code series C2 is 3 because one data byte later recorded adjacent to the preceding data portion is included in the code series C2 in addition to the two error bytes detected from the code series C1. The result is a mismatch between the series C1 and C2 (all-error flag state of (3) above), detected in steps 111 and 112 constituting the erroneous correction detecting means of FIG. 6. In this state, all 24 data bytes in the code series C2 are considered erroneous. That is, correctable errors around the C1 error area, i.e., an area of inevitable errors attributable to clock disturbance at the data junction, are erroneously considered uncorrectable errors.

The all-error flag state of the data bytes in the code series C2 continues up to the section S4 in FIG. 7B. The error is regarded as a burst error spanning as many as 120 frames.

Thus, when the conventional error detection and correction routine of FIGS. 5 and 6 is executed at a junction between⁺data portions recorded adjacent to each over but discontinuously over time, an inevitable error of 5 to 10 frames can be regarded as a huge burst error spanning about 120 frames. As a result, correct data can be considered erroneous and prevented from reproduction.

The conventional method of bypassing the above problem on the compact disc involves providing a sufficiently large null data section at each junction between connected portions of recorded data. On the above-described optical disc, meanwhile, the intermittent recording of data in units of clusters means recording data in a junction-forming manner in those units. Where the data unit for intermittent recording and reproduction is made of 32 sectors as described, recording 74 minutes of audio signals on the optical disc would involve carrying out about 2,000 junction recordings. It follows that furnishing a large null data area at each junction between intermittently recorded data portions can seriously impede the effort to utilize the recordable disc area efficiently.

The disc recording and reproducing system outlined above takes into account the number of frames vulnerable to error propagation at junctions between recorded data portions. That is, the above system allows for a four-sector junction area between 32-sector data clusters. The disc system utilizes three sectors out of these four to prevent error propagation at the data junctions.

Suppose that where data is recorded in a physically continuous but chronologically discontinuous manner, the disc recording and reproducing system performs the error correcting and decoding process based on the CIRC. In that case, as described above and as shown in FIG. 8, a hardware error (C1 error) occurs due to the discontinuity of recorded signals over a section of 5 to 10 frames.

The hardware error develops into a C2 error spanning about 120 frames depicted in FIG. 8 (all-error state). The development of the error is attributable to the interleaving of 108 frames of the code series C2.

The disc recording and reproducing system further utilizes the ACIRC (Advanced Cross Interleave Reed-Solomon Code, an improved CIRC) to add the interleaving process outside the code series C2. This means that, as shown in FIG. 8, the interleaving based on the ACIRC incurs another all-error section made up of 108 frames. As far as the data structure of the above-mentioned optical disc recording and reproducing system is concerned, the code scheme can result in a burst error section including about 230 frames at a junction of intermittently recorded data.

As shown in an enlarged view of a data junction in FIG. 9, given the data structure of the above optical disc recording and a reproducing system, there exists a three-sector linking area LK between a 32-sector audio data portion and 1 sub-data sector as mentioned. The sector structure data after error correction does not include eight-byte parity data. Since 1 frame consists of 24 bytes of audio data, 1 sector is made of 98 frames. Thus the three-sector linking area LK constitutes 294 frames.

It follows that even if a burst error spanning as many as 230 frames occurs, there ideally exists a margin area of 30 to 40 frames before the sub-data sector and after the cluster-unit audio sector. In this manner, the audio data and sub-data are protected from the burst error.

Illustratively, the above-described disc recording and reproducing system may utilize an optical disc of the above data structure to record and read not audio data but computer data and the like to and from the disc.

Given the optical disc 21B with absolute addresses formed thereon, the system records and reproduces while monitoring these addresses the audio data in units of clusters made of 36 sectors each. These addresses are provided in hexadecimal notation as shown in FIG. 10.

As already described, the absolute address data recorded in the pre-grooves of the optical disc 21B requires the use of about 2,000 cluster addresses for accommodating audio signals of 74 minutes. One absolute address is composed of a two-byte cluster address (cluster number) and of a one-byte sector address, one cluster being equal to 36 sectors.

Sector addresses "00" through "1F" constitute a data area. Compressed audio data of 32 sectors is recorded in the data area. The four-sector linking area for cluster connection is assigned sector addresses "FC," "FD," "FE" and "FF." Link data (dummy data) is inserted to the sector addresses "FC," "FD" and "FE" while sub-data is recorded to the sector address "FE."

The 36-sector address ranging from "FC" to "1F" is assigned to each of cluster numbers (i.e., cluster addresses) N, N+1, N+2, etc. (N is a natural number.)

Suppose that computer data is recorded to and read out from the optical disc 21B having the above absolute addresses recorded previously thereon, the absolute addresses being used unmodified for the reading or recording operation. In that case, the data may be recorded to and read out from the disc in units of 36 sectors.

Since one sector contains 2 Kbytes of data, the data is recorded to and read out from the disc in units of 64 Kbytes (i.e., 36 sectors). Although the size of such a data unit is suitable for setups handling mass amounts of data such as image data, that data unit is too large to use in dealing with ordinary computer data.

SUMMARY OF THE INVENTION

It is, therefore, an object of the present invention to provide a digital data recording method which resolves the above-mentioned problem.

It is another object of the present invention to provide a digital data reproducing method which resolves the above-mentioned problem.

According to one aspect of the present invention, there is provided a digital data recording method comprising the steps of: converting digital data to a sector structure of a predetermined data quantity; performing an error correction and encoding process including interleaving on the converted data; and recording the processed data to a disc-shaped storage medium rotated at a constant linear velocity, the disc-shaped storage medium having address information recorded previously thereon. The address information is composed of repetitions of a plurality of sectors. The recording of the data to the disc-shaped storage medium is performed in accordance with the address information and in increments of a designated recording unit made of a plurality of sectors including linking and data recording sectors. The recording unit is not greater than the number of the repeated sectors of the address information.

According to another aspect of the present invention, there is provided a digital data reproducing method comprising the steps of: rotating a disc-shaped storage medium at a constant linear velocity; and reproducing data from the disc-shaped storage medium having address information recorded previously thereon, the address information being composed of repetitions of a plurality of sectors. The disc-shaped storage medium has a data recording and reproducing unit recorded in a specific location thereon different from the locations in which the data is recorded. The data recording and reproducing unit is composed of linking and data recording sectors and is not greater than the number of the repeated sectors of the address information. Upon data reproduction, information about the data recording and reproducing unit recorded in the specific location on the disc-shaped storage medium is read therefrom to identify the data recording and reproducing unit. The data is reproduced from the disc-shaped storage medium in increments of the data recording and reproducing unit thus identified.

According to a further aspect of the present invention, there is provided a digital data recording and reproducing method comprising the steps of: converting digital data to a sector structure of a predetermined data quantity; performing an error correction and encoding process including interleaving on the converted+data; and recording the processed data to a disc-shaped storage medium rotated at a constant linear velocity, the disc-shaped storage medium having address information recorded previously thereon. The address information is composed of repetitions of a plurality of sectors. The recording of the processed data to the disc-shaped storage medium is performed in accordance with the address information and in increments of a data recording and reproducing unit made of a plurality of sectors including linking and data recording sectors. The data recording and reproducing unit is not greater than the number of the repeated sectors of the address information. Upon data reproduction, information about the data recording and reproducing unit recorded in a specific location on the disc-shaped storage medium is read therefrom to identify the data recording and reproducing unit. The data is reproduced from the disc-shaped storage medium in increments of the data recording and reproducing unit thus identified.

The invention makes it possible to record or reproduce data to or from the disc-shaped storage medium in units of a designated data recording or reproducing unit, the storage medium having suitable address information recorded previously thereon. The data recording or reproducing unit is varied as designated in accordance with the type of the data recorded on the storage medium. This feature is convenient in recording and reading data to and from the disc-shaped storage medium.

Furthermore, the invention allows the previously recorded address information to be used unmodified in recording ordinary digital data to the disc-shaped storage medium which is originally intended to record audio data.

Other objects, features and advantages of the present invention will become apparent in the following specification and accompanying drawings.

BRIEF DESCRIPTION OF THE DRAWINGS

The invention will be more readily understood with reference to the accompanying drawings, wherein:

Figures 7A, 7B:
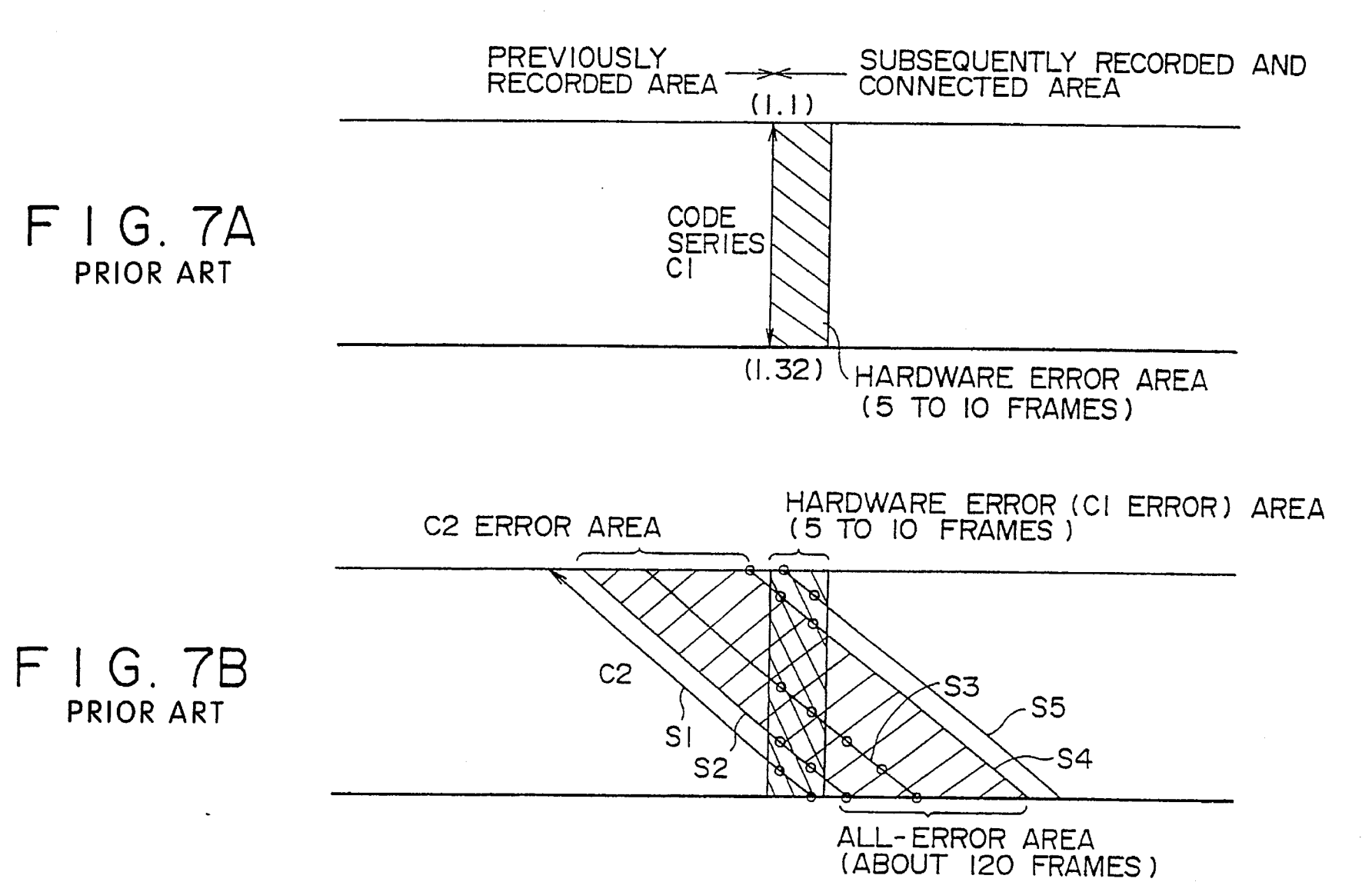

FIGS. 7A and 7B are views portraying how errors occur at a data junction, FIG. 7A showing data being rearranged in bytes in the memory, FIG. 7B illustrating how errors can take place continuously;

FIG. 11 is a view showing a recording and reproducing unit for use with the digital data recording and reproducing methods according to the invention;

FIG. 12 is a view showing another recording and reproducing unit for use with the digital data recording and reproducing methods according to the invention;

FIG. 13 is a view showing another recording and reproducing unit for use with the digital data recording and reproducing methods according to the invention;

FIG. 14 is a view showing another recording and reproducing unit for use with the digital data recording and reproducing methods according to the invention;

FIG. 15 is a view showing another recording and reproducing unit for use with the digital data recording and reproducing methods according to the invention;

FIG. 16 is a view showing another recording and reproducing unit for use with the digital data recording and reproducing methods according to the invention;

DESCRIPTION OF THE INVENTION

Figure 9:
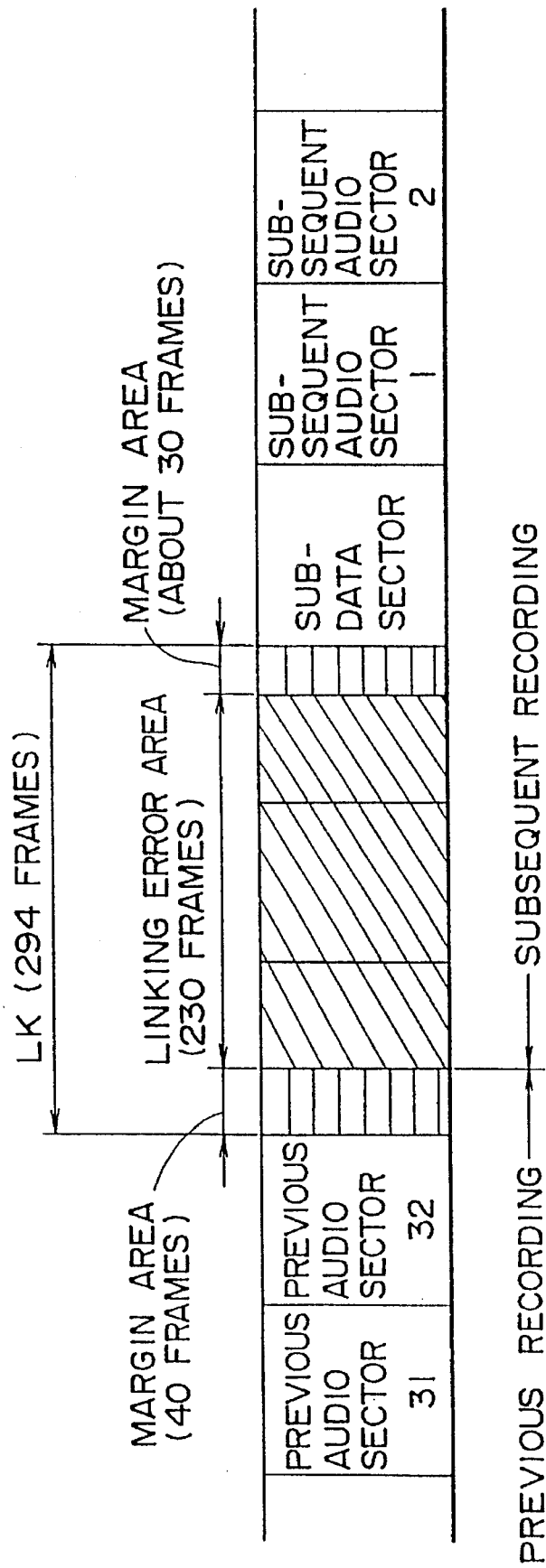
FIG. 9 is a view sketching areas for linking data recorded on a disc.
Figure 10:
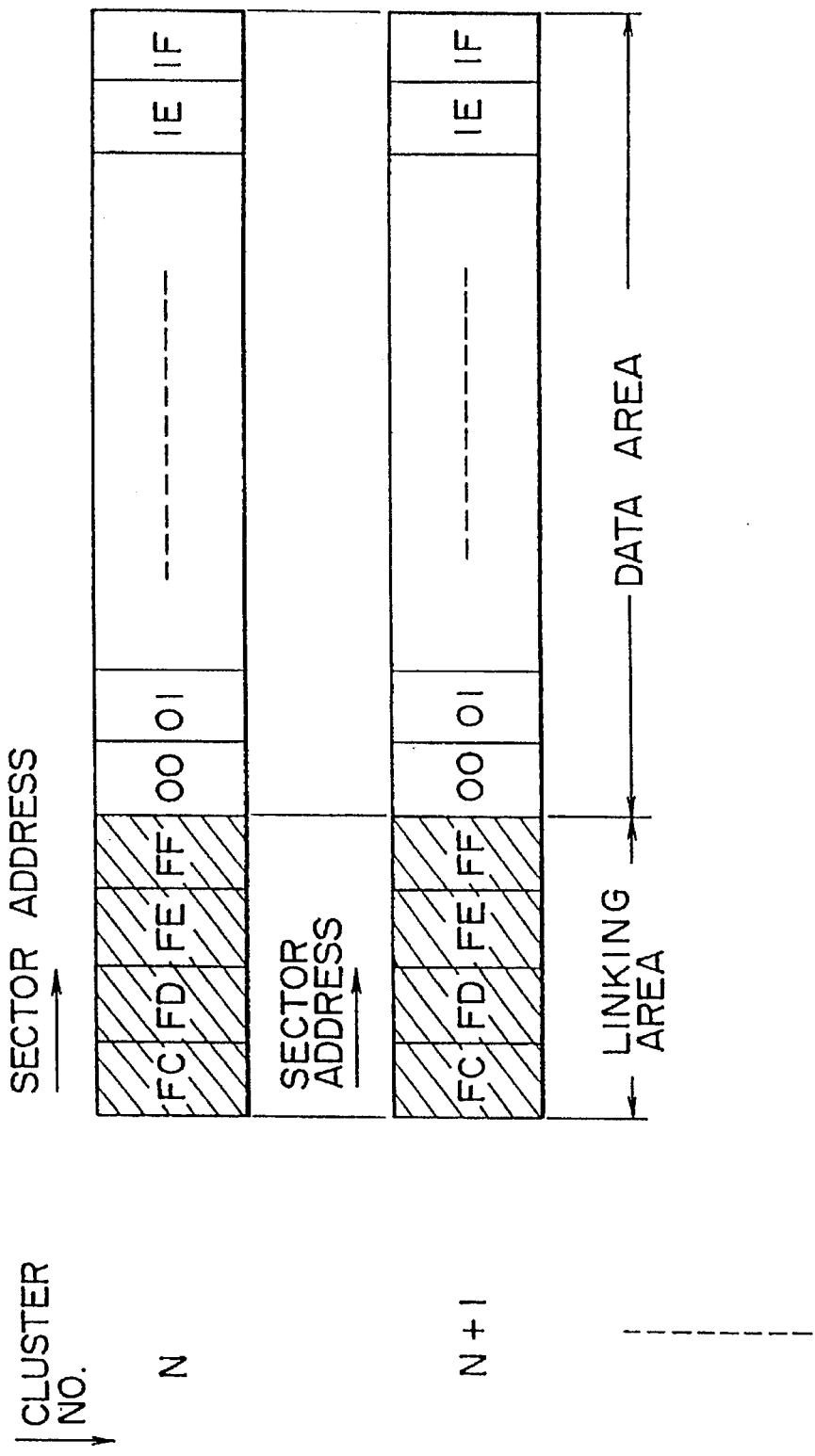
FIG. 10 is a view illustrating how data addresses are recorded on a disc.

Preferred data recording and reproducing methods practiced to embody the invention will now be described with reference to the accompanying drawings. The embodiment involves applying the invention to the optical disc having the above-mentioned data structure. What is envisaged by the embodiment is to reduce the size of the unit for recording and reproducing data to and from the optical disc without changing the structure of the absolute addresses previously recorded in the pre-grooves of that disc.

Where the optical disc is used to store audio signals, it has the cluster-sector structure illustrated in FIG. 9. Where the disc is used to store ordinary data, each cluster is split into a plurality of divisions. These divisions are regarded as new clusters that constitute units in which to record and reproduce the data to and from the optical disc.

In the description that follows regarding the use of the optical disc for data storage, the cluster shown in FIG. 9 is considered a "virtual" cluster; the divisions derived from virtual clusters so as to constitute the recording and reproducing unit are regarded as "real" clusters.

As described, three linking sectors with the exception of the sub-data sector are needed to make up a linking area. That is, the recording and reproducing unit is composed of four sectors (1 sector being 1 data item). The size of the real cluster can be any one of 33 options, ranging from 4 to 36 sectors.

The example of FIG. 11 illustrates an address structure in effect when the real cluster is constituted by four sectors. In this example, the virtual cluster having number N is divided in increments of four sector addresses. The four-sector divisions are respectively assigned nine real cluster numbers (real cluster addresses) N(9)+0, N(9)+1, ..., N(9)+8. That is, one virtual cluster is split into nine real clusters.

As shown in FIG. 11, the four sectors having sector addresses "FC" through "FF" are considered to have the real cluster number N(9)+0. The four sectors with sector addresses "00" through "03" have the real cluster number N(9)+1, and the four sectors with sector addresses "04" through "07" have the real cluster number N(9)+2. In like manner, a real cluster address is assigned to each of the subsequent four-sector addresses. Data is recorded and reproduced in units of real clusters including four sectors each.

Reference character N in a real cluster number represents a virtual cluster number (i.e., the cluster address of an absolute address), and the numeral in parentheses stands for the number of the divisions involved. The numeral suffixed to the combination of the character N and the parenthesized number denotes where the real cluster in question stands in the order of the real clusters making up the virtual cluster. The same holds true for the examples that follow.

In the example of FIG. 11, the three sectors shaded constitute linking sectors. That is, the first three of the four sectors making up a real cluster are used as linking sectors and the remaining one as a data sector. Because the effective data area within each real cluster is one sector (equal to 2 Kbytes, or 2048 bytes), the unit for recording and reproducing data in this example is 2 Kbytes.

The example of FIG. 12 shows an address structure with each real cluster composed of five sectors. In this example, the virtual cluster with number N is divided in increments of five sector addresses. The five-sector divisions are respectively assigned seven real cluster numbers (real cluster addresses) N(7)+0, N(7)+1, ..., N(7)+6. That is, the example involves splitting one virtual cluster into seven real clusters.

As illustrated in FIG. 12, the five sectors having sector addresses "FC" through "FF" and "00" are considered to have the real cluster number N(7)+0. The five sectors with sector addresses "01" through "05" have the real cluster number N(7)+1, and the five sectors with sector addresses "06" through "0A" have the real cluster number N(7)+2. In like manner, a real cluster address is assigned to each of the subsequent five-sector addresses. Data is recorded and reproduced in units of real clusters comprising five sectors each. In the example of FIG. 12, one sector with sector address "1F" is left out of the cluster arrangement. This sector is left where it is as an option.

In the example of FIG. 12, the three sectors shaded also constitute linking sectors. Because there are two data sectors involved, the unit for recording and reproducing data in this example is 4 Kbytes.

The example of FIG. 13 depicts an address structure with each real cluster composed of six sectors. In this example, the virtual cluster with number N is divided in increments of six sector addresses. The six-sector divisions are respectively assigned six real cluster numbers (real cluster addresses) N(6)+0, N(6)+1, ..., N(6)+5. That is, the example involves splitting one virtual cluster into six real clusters.

As shown in FIG. 13, the six sectors having sector addresses "FC" through "FF," "00" and "01" are considered to have the real cluster number N(6)+0. The six sectors with sector addresses "02" through "07" have the real cluster number N(6)+1, and the six sectors with sector addresses "08" through "0D" have the real cluster number N(6)+2. In like manner, a real cluster address is assigned to each of the subsequent six-sector addresses. Data is recorded and reproduced in units of real clusters including six sectors each.

In the example of FIG. 13, the three sectors shaded also constitute linking sectors. Because there are three data sectors involved, the unit for recording and reproducing data in this example is 6 Kbytes.

The example of FIG. 14 illustrates an address structure with each real cluster composed of five sectors. In this example, the virtual cluster with number N is divided in increments of seven sector addresses. The seven-sector divisions are respectively assigned five real cluster numbers (real cluster addresses) N(5)+0, N(5)+1, ..., N(5)+4. That is, the example involves splitting one virtual cluster into five real clusters.

As sketched in FIG. 14, the seven sectors having sector addresses "FC" through "FF" and "00" through "02" are considered to have the real cluster number N(5)+0. The seven sectors with sector addresses "03" through "09" have the real cluster number N(5)+1, and the seven sectors with sector addresses "0A" through "10" have the real cluster number N(5)+2. Similarly, a real cluster address is assigned to each of the subsequent seven-sector addresses. Data is recorded and reproduced in units of real clusters including seven sectors each. In the example of FIG. 14, one sector with sector address "1F" is also left out of the cluster arrangement. As in the case above, this sector is left where it is as an option.

In the example of FIG. 14, the three sectors shaded also constitute linking sectors. Because there are four data sectors involved, the unit for recording and reproducing data in this example is 8 Kbytes.

The example of FIG. 15 shows an address structure with each real cluster composed of 12 sectors. In this example, the virtual cluster with number N is divided in increments of 12 sector addresses. The 12-sector divisions are assigned three real cluster numbers (real cluster addresses) N(3)+0, N(3)+1 and N(3)+2. The 12 sectors having sector addresses "FC" through "FF" and "00" through "07" are considered to have the real cluster number N(3)+0. The 12 sectors with sector addresses "08" through "13" have the real cluster number N(3)+1, and the 12 sectors with sector addresses "14" through "1F" have the real cluster number N(3)+2. That is, the example involves splitting one virtual cluster into three real clusters.

Data is recorded and reproduced in units of real clusters including 12 sectors each. In the example of FIG. 15, the three sectors shaded also constitute linking sectors. Because there are nine data sectors involved, the unit for recording and reproducing data in this example is 18 Kbytes.

The example of FIG. 16 depicts an address structure with each real cluster composed of 18 sectors. In this example, the virtual cluster with number N is divided into two 18-sector addresses. The 18-sector divisions are assigned two real cluster numbers (real cluster addresses) N(2)+0 and N(2)+1. The 18 sectors having sector addresses "FC" through "FF" and "00" through "0D" are considered to have the real cluster number N(2)+0. The 18 sectors with sector addresses "0E" through "1F" have the real cluster number N(2)+1. Data is recorded and reproduced in units of real clusters including 18 sectors each.

In the example of FIG. 16, the three sectors shaded also constitute linking sectors. Because there are 15 data sectors involved, the unit for recording and reproducing data in this example is 30 Kbytes.

The optical disc stores either audio signals or ordinary data. The information about whether the optical disc is of audio signal storage type or of data storage type is recorded in the PTOC. When the optical disc is loaded into the system, the system identifies the type of the optical disc by reading the PTOC. For disc identification, the optical disc of audio signal storage type has the characters "MINI" recorded in ASCII codes in its PTOC as mentioned earlier; the optical disc of data storage type has the characters "MINX" recorded in ASCII codes in its PTOC.

With the optical disc of data storage type, the system operating on the inventive method permits the selection of a desired unit in which to record and reproduce data to and from the disc. Illustratively, a display unit of the system displays a list of selectable data recording and reproducing units from which the user chooses a desired unit.

The recording and reproducing unit designated or selected at the time of formatting an optical disc remains fixed thereafter for that disc. There is no possibility that different units for recording and reproducing data would coexist on a single optical disc. Needless to say, formatting the disc anew changes the data recording and reproducing unit thereof as desired.

Figure 17:
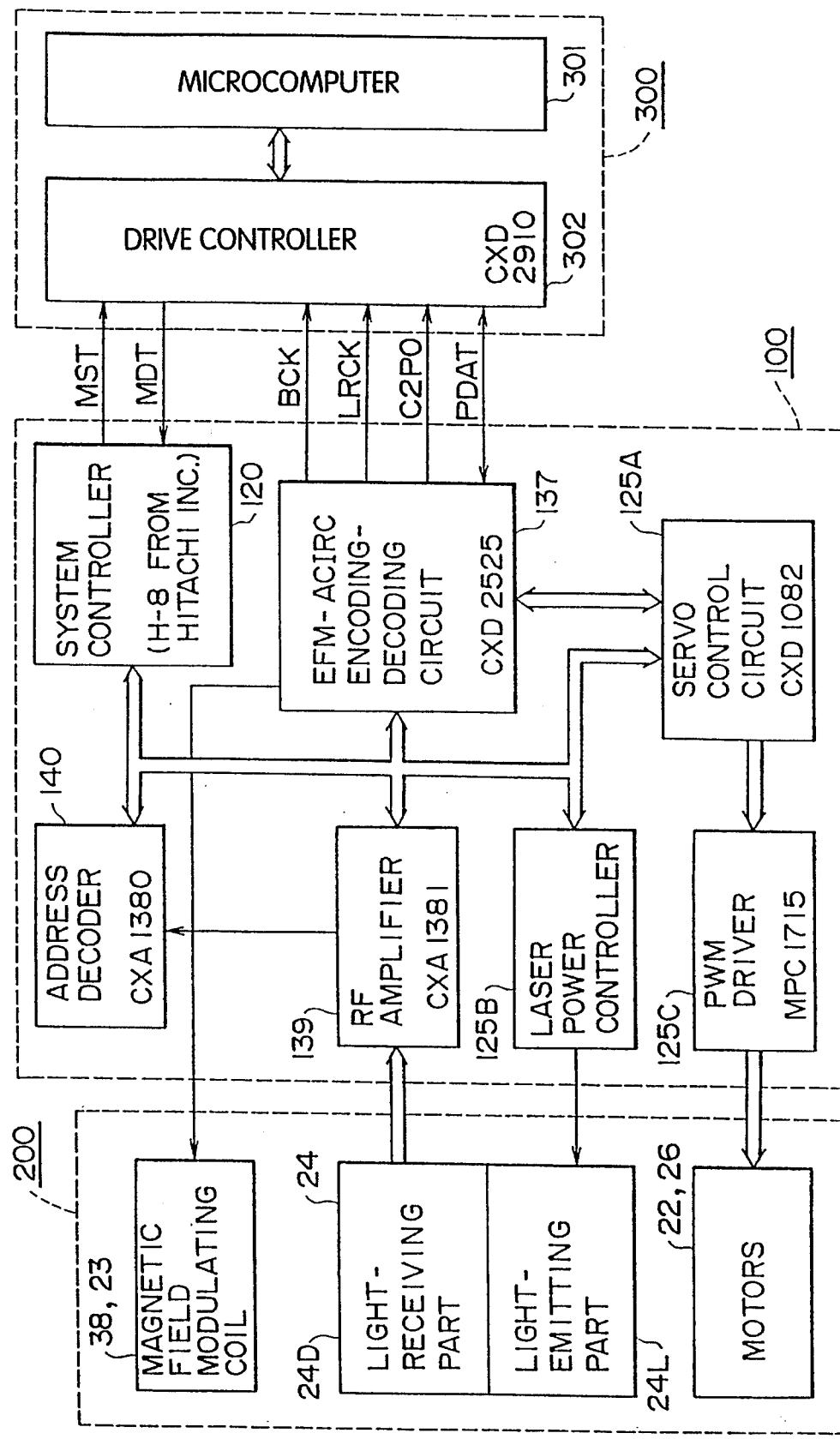
FIG. 17 is a block diagram of a system to which the data recording and reproducing methods of the invention are applied.

FIG. 17 is a block diagram of a system to which the data recording and reproducing methods of the invention are applied. In FIG. 17, reference numeral 100 stands for an optical disc data drive unit, 200 for a recording and reproducing section, and 300 for a microcomputer system.

Figure 1:
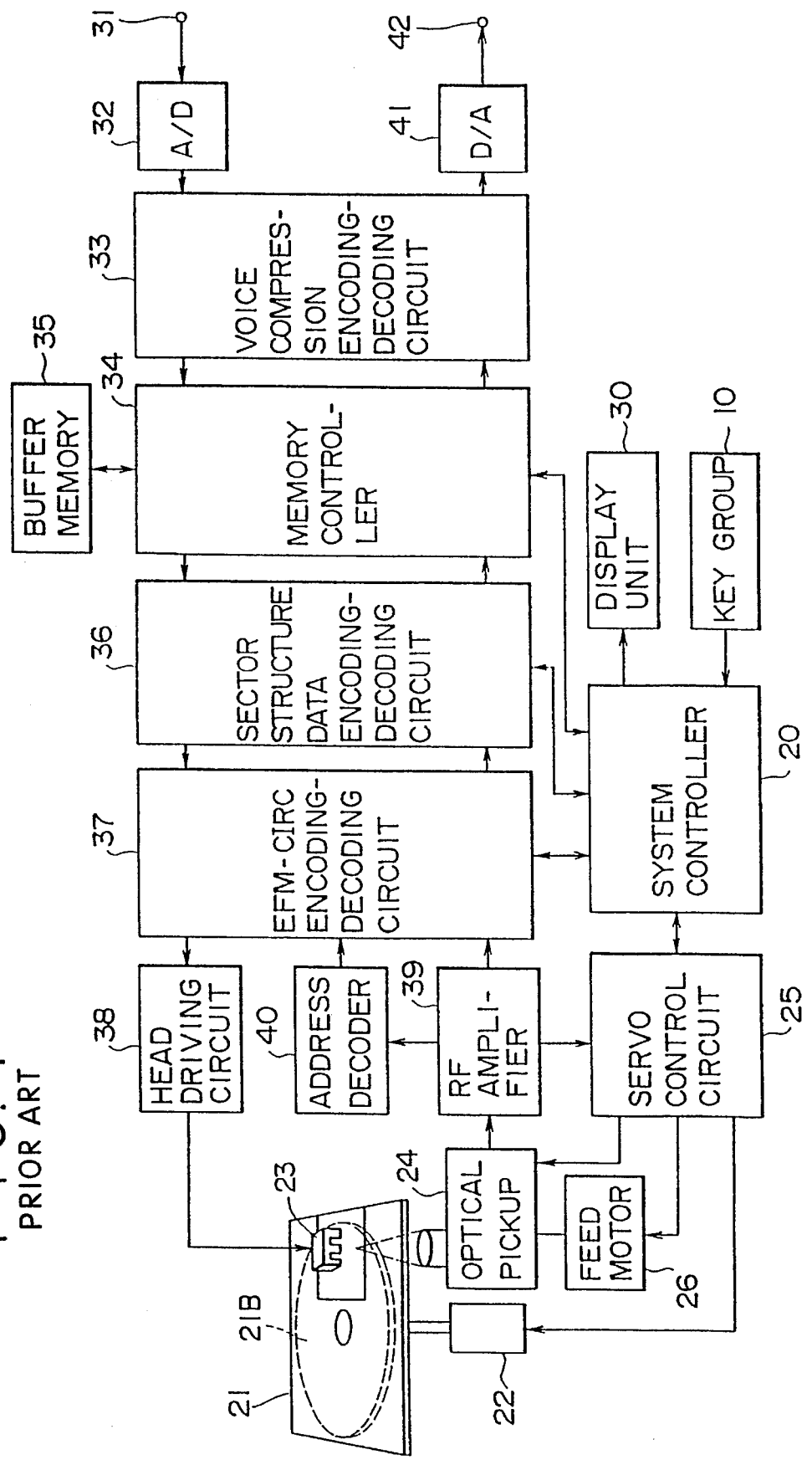
FIG. 1 is a block diagram of the typical disc recording and reproducing system that serves as the background for the invention.
Figure 2:
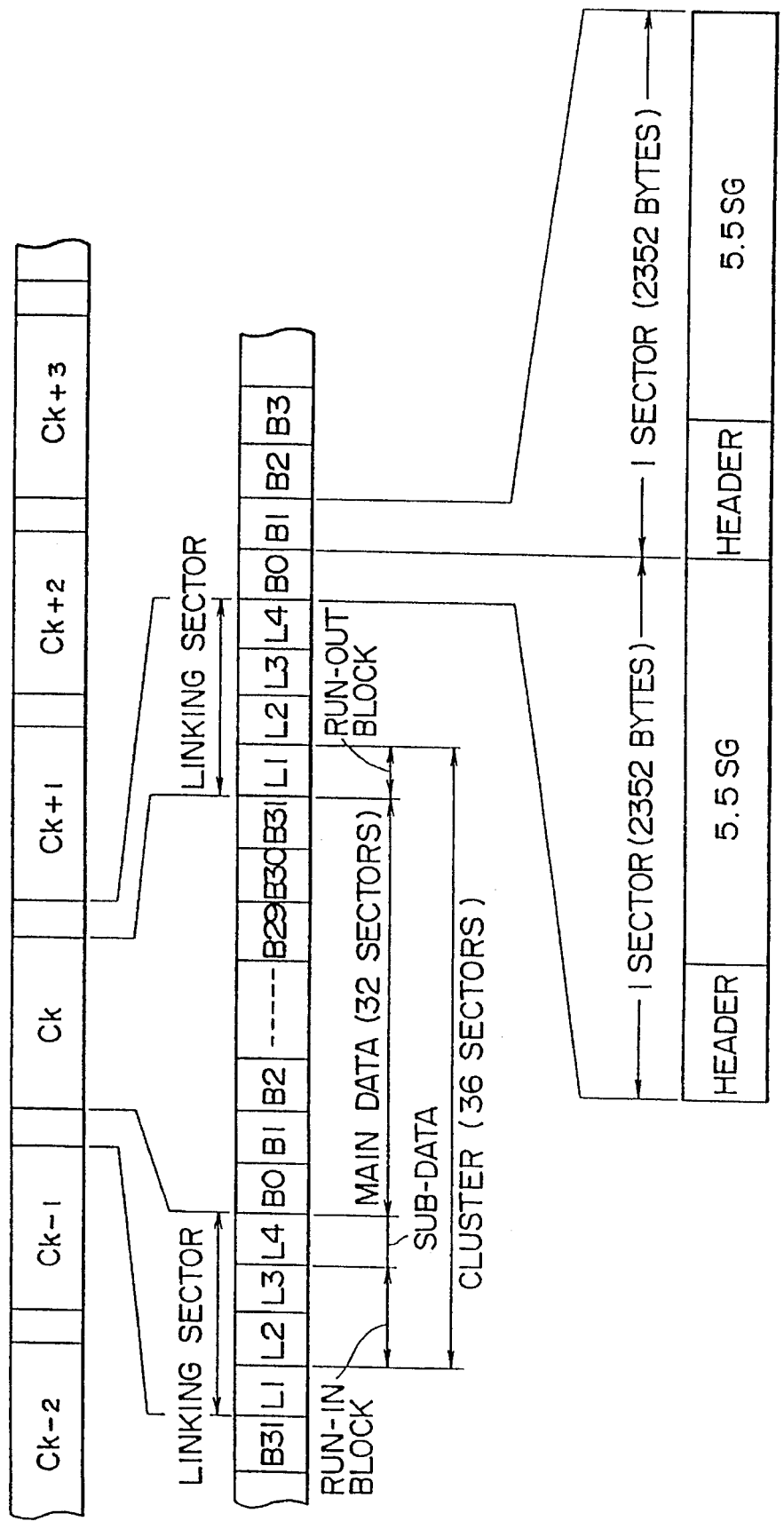
FIG. 2 is a view showing a structure of data to be recorded by the system of FIG. 1 to a disc.
Figure 3:
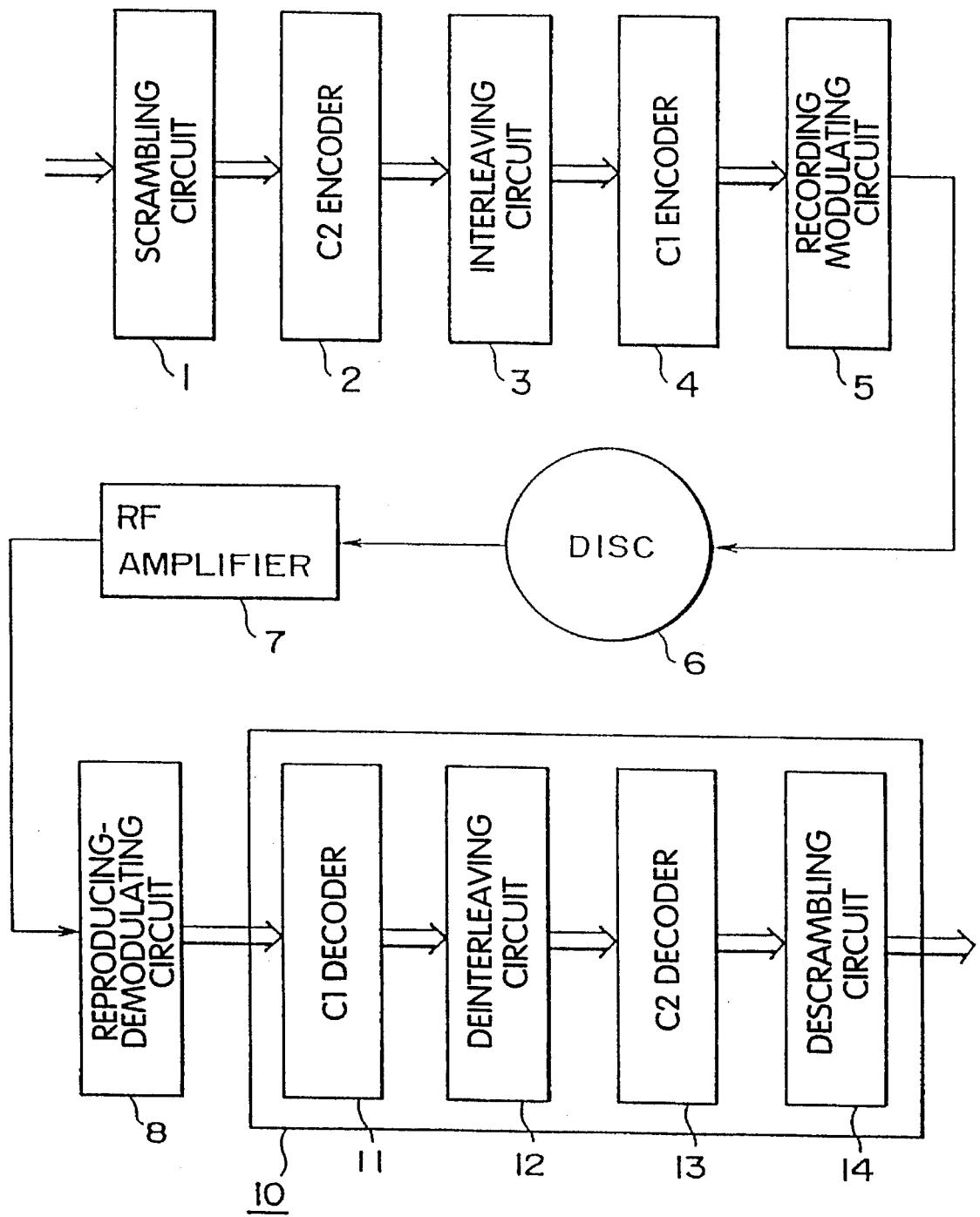
FIG. 3 is a view depicting a process of error correction, encoding and decoding performed on audio data.
Figure 4A:
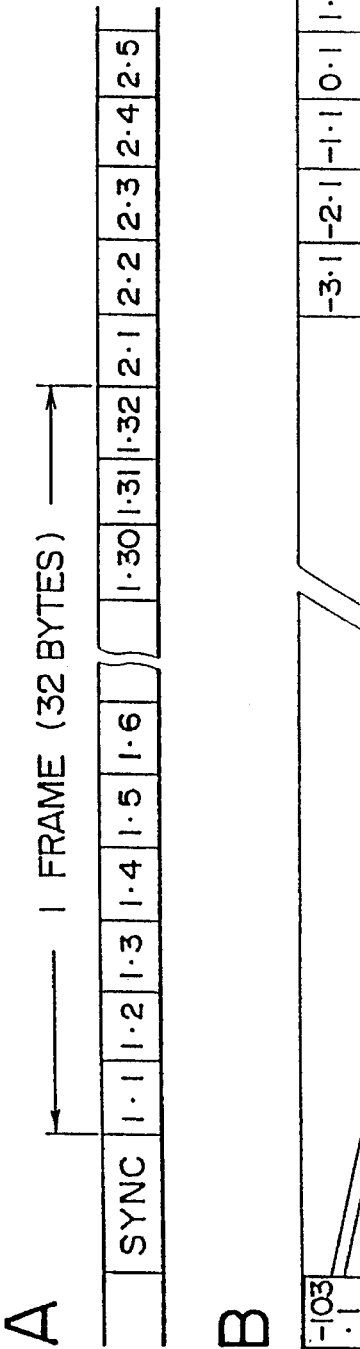
FIGS. 4A and 4B are views illustrating examples of error correction codes for audio data, FIG. 4A showing a structure of binary output data, FIG. 4B depicting an error correction code series.
Figure 4B:
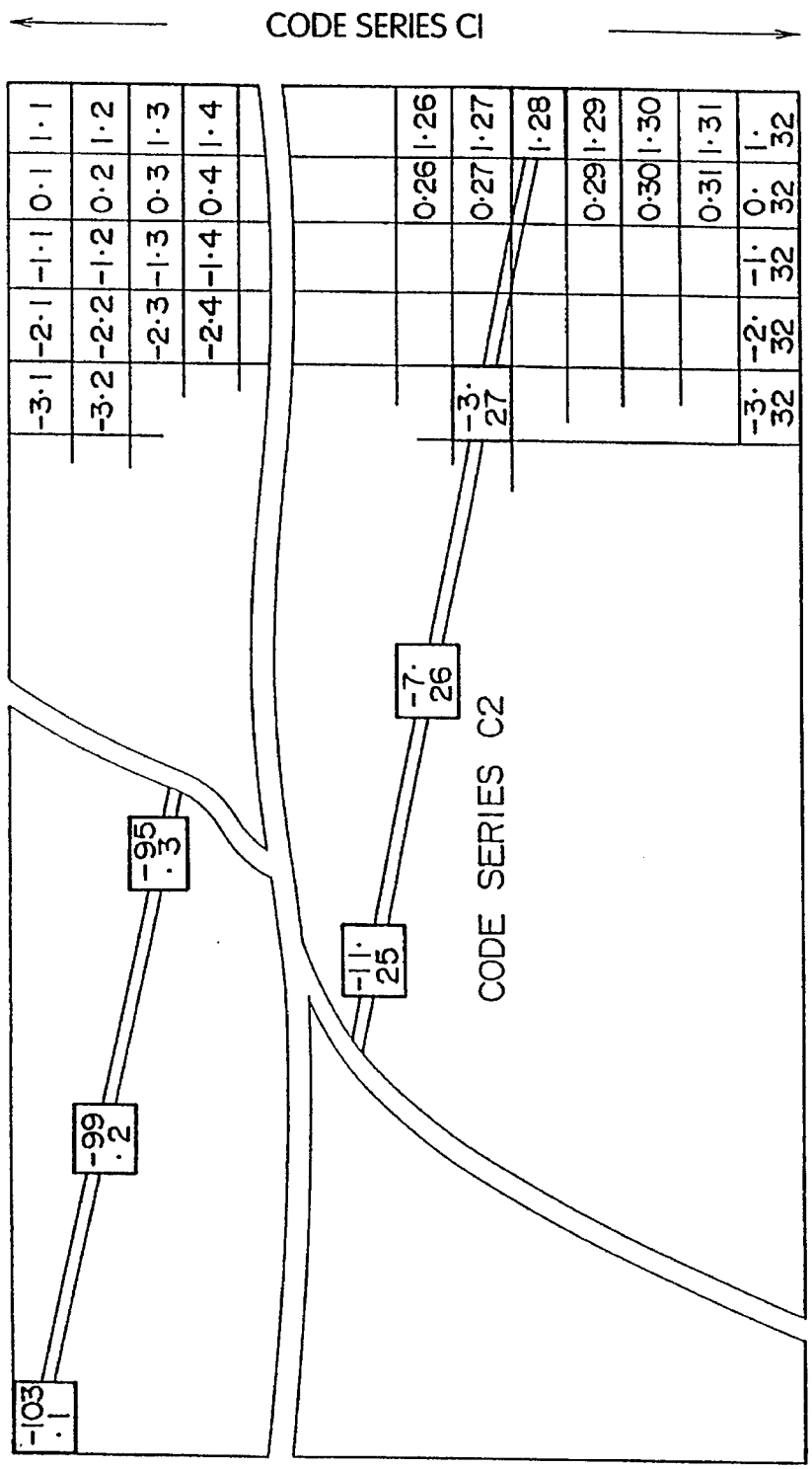
Figure 5:
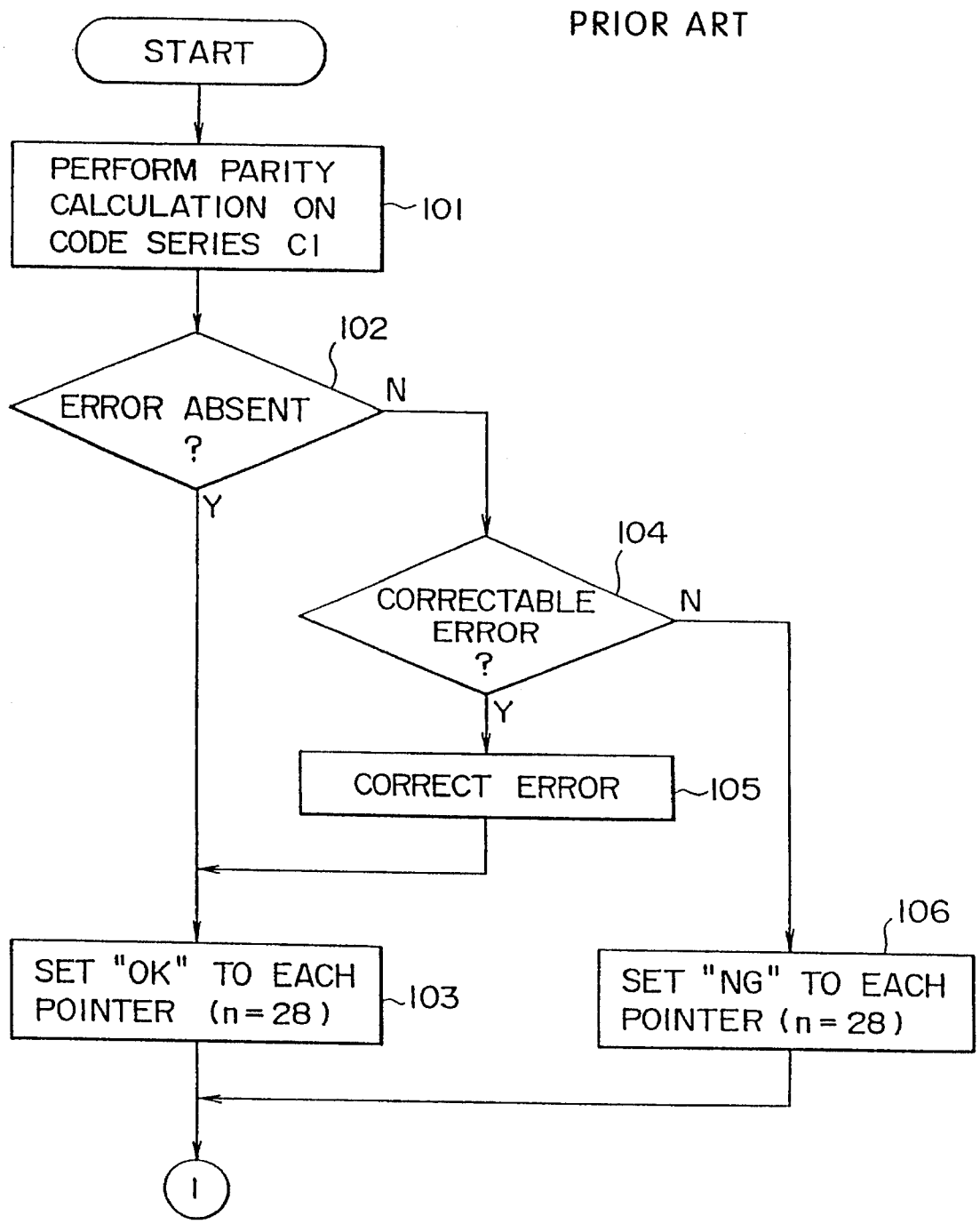
FIG. 5 is a flowchart showing part of the error correction process of FIG. 3.
Figure 6:
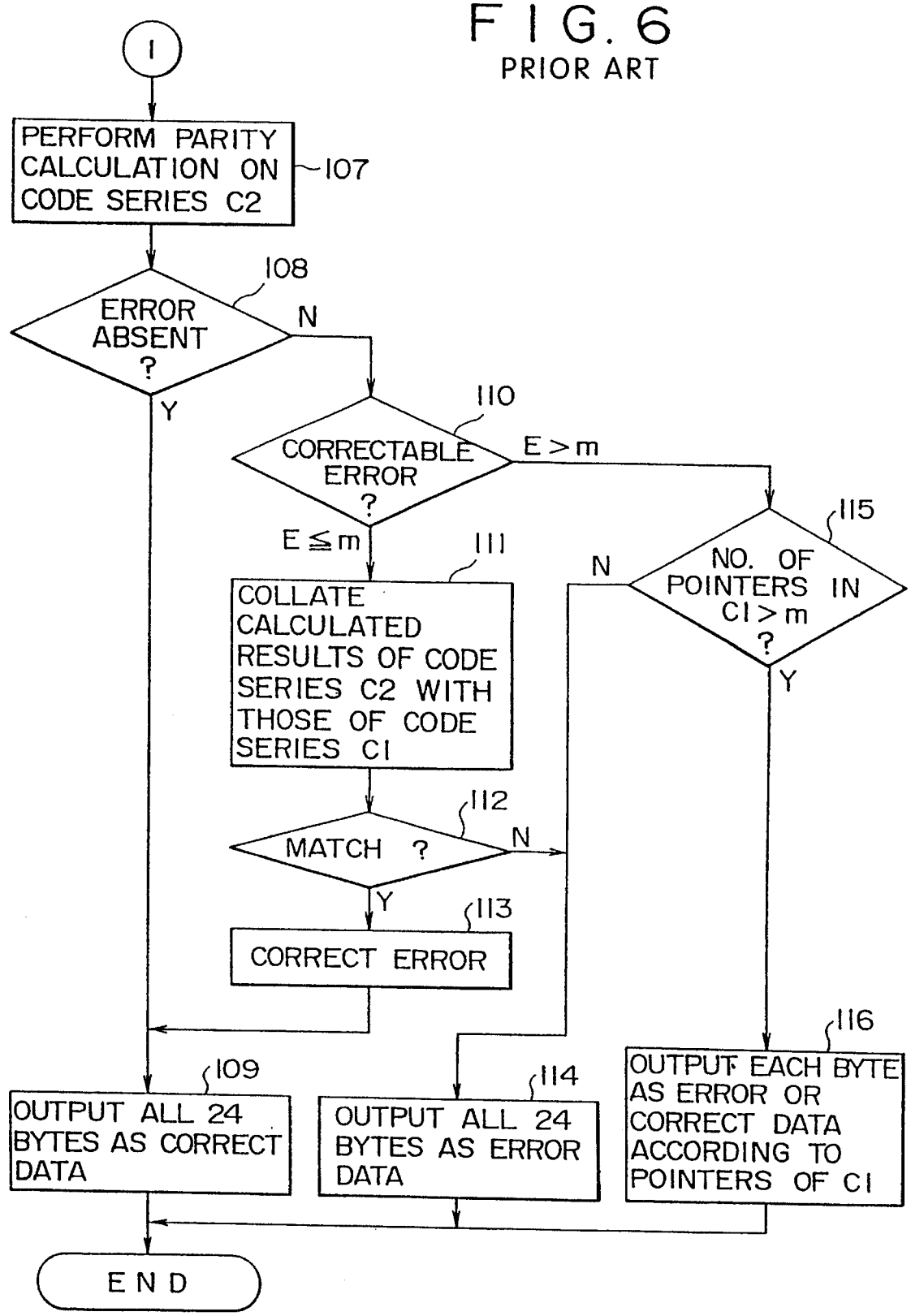
FIG. 6 is a flowchart showing another part of the error correction process of FIG. 3.
Figure 8:
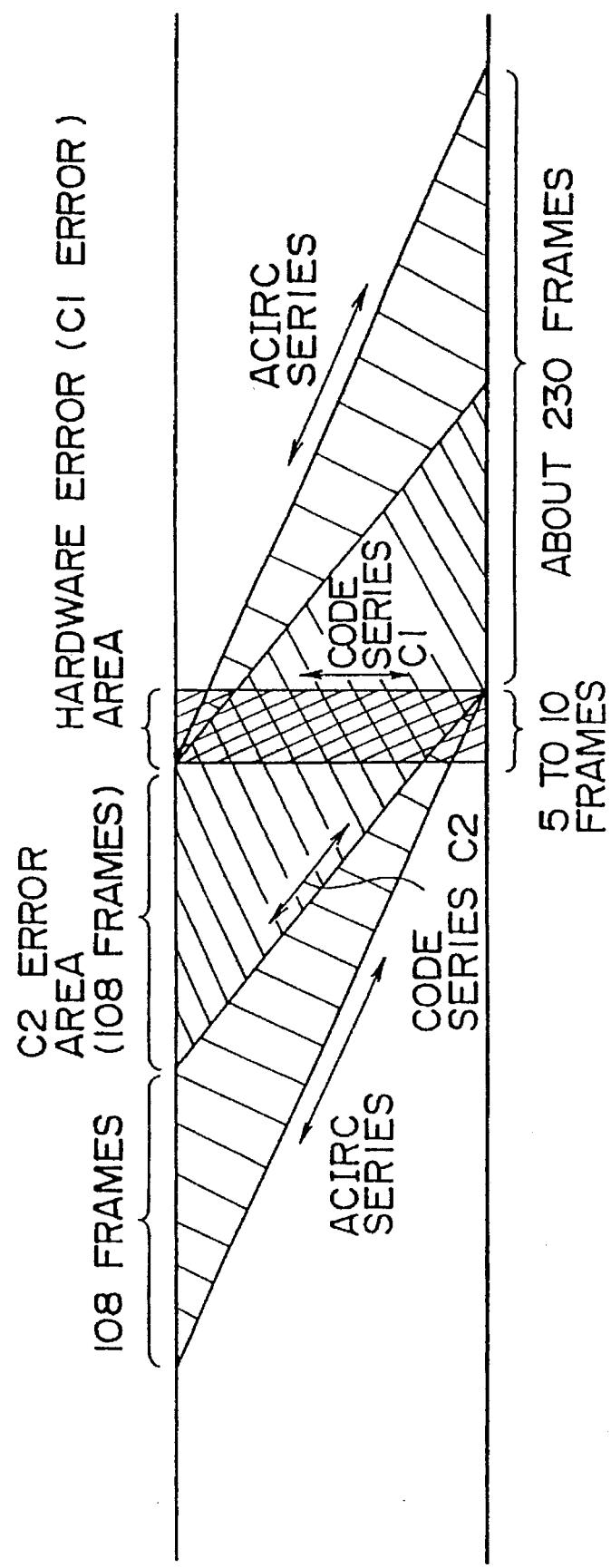
FIG. 8 is a view depicting how an error occurs at a data junction.

The recording and reproducing section 200 is identical in construction to the recording and reproducing section of the optical disc recording and reproducing system of FIG. 1. The section 200 has a spindle motor 22, feed motors 26, an optical pickup 24 made of a light-receiving part 24D and a light-emitting part 24L, a magnetic field modulating coil (including a head driving circuit 38), and a disc loading part (not shown).

The optical disc data drive unit 100 includes an EFM-ACIRC encoding-decoding circuit 137 that is identical in construction to the EFM-CIRC encoding-decoding circuit 37 in the disc recording and reproducing system of FIG. 1. The data drive unit 100 also has an RF amplifier 139 identical to the RF amplifier 39, an address decoder 140 identical to the address decoder 40, a servo control circuit 125A identical to the servo control circuit 25, a laser power controller 125B, a PWM driver 125C, and a system controller 120 that differs slightly from the system controller 20.

Illustratively, the encoding-decoding circuit 137 may be an IC CXD2525 from Sony Corp. Likewise, the RF amplifier 139 may be an IC CXA1381 from Sony Corp; the address decoder 140, an IC CXA1380 from Sony Corp; the servo control circuit 125A, an IC CXD1082 from Sony Corp; the PWM driver 125C, an IC MPC1715 from Mitsubishi Electric Corp; and the system controller 120, an IC H-8 from Hitachi, Ltd.

It should be noted that the analog-to-digital converter 32, audio compression encoding-decoding circuit 33, memory controller 34, sector structure data encoding-decoding circuit 36 and digital-to-analog converter 41 of FIG. 1 are not furnished in the optical disc data drive unit 100.

The microcomputer system 300 is composed of a host computer (microcomputer) 301 and a drive controller 302. The system 300 is equipped with a display and a keyboard that serves as input means, both not shown. The drive controller 302 may illustratively be an IC CXD2910 from Sony Corp.

An instruction from the host computer 301 is sent as a command MDT via the drive controller 302 to the system controller 120 of the data drive unit 100. A status signal from the system controller 120 is transmitted via the drive controller 302 to the host computer 301.

The drive controller 302 exchanges clock and data signals with the EFM-ACIRC encoding-decoding circuit 137. A bit clock signal BCK and a word clock signal LRCK from the circuit 137 are provided in synchronism with data bits and data words, respectively. Error information C2PO is output by the circuit 137 to identify the data whose error was not corrected during the error detection and correction based on the ACIRC. Data PDAT is exchanged between the microcomputer system 300 and the data drive unit 100.

The data drive unit 100 gains access precisely to the addresses designated by the microcomputer system 300. Data is read from the accessed addresses in increments of the designated data reading and reproducing unit.

Data is recorded to the optical disc as follows: the disc cartridge is first loaded into the system. The system in turn reads the PTOC of the optical disc to retrieve data therefrom. The data retrieved from the PTOC is sent via the system controller 120 to-the microcomputer system 300 for disc identification, i.e., to see if the loaded optical disc is of audio signal storage type or of data storage type.

If the optical disc is of data storage type and has yet to be formatted, a message to that effect appears on the display unit of the system 300. The user then enters an instruction format the disc, designating the size of the recording and reproducing unit illustratively through the keyboard. The appropriate size of the recording and reproducing unit is set by the user in accordance with the type of the data to be handled.

Following the input process for disc formatting, the host computer 301 or the drive controller 302 tells the system controller 120 to format the optical disc. In turn, the system controller 120 formats the disc and records the data about the size of the recording and reproducing unit to the disc UTOC.

With the formatting completed, the optical disc is ready to accommodate data. Data is then recorded to the disc in increments of the unit established.

Figure 18:
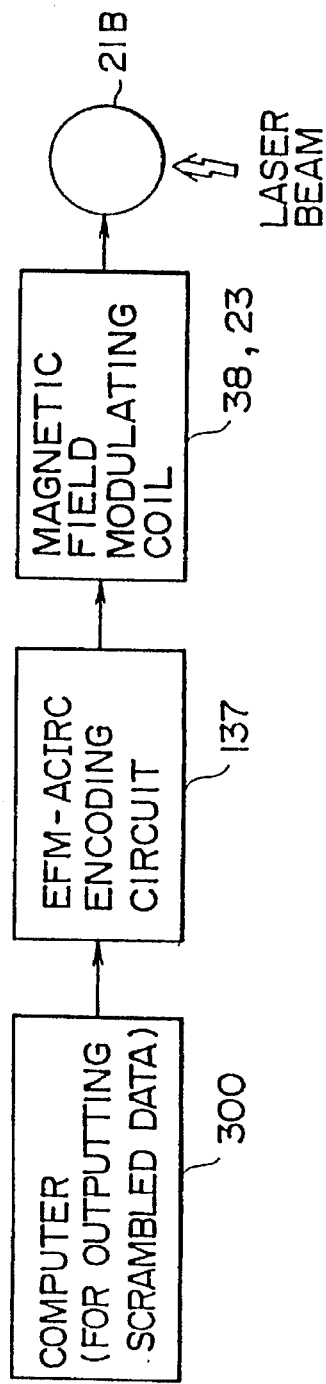
FIG. 18 is a block diagram depicting the flow of data during data recording according to the invention.

The flow of data during data recording is illustrated in FIG. 18. The target data to be recorded is scrambled into CD-ROM sector structure data by the drive controller 302 of the microcomputer system 300. The scrambled data is in increments of the recording and reproducing unit established. In some cases, the data is subjected to a predetermined process of error correction and encoding.

The data PDAT is supplied to the EFM-ACIRC encoding-decoding circuit 137 of the data drive unit 100. As in the case of audio data described earlier, the data PDAT is subjected to ACIRC encoding and EFM encoding. Thereafter, the encoded data is supplied to the magnetic field modulating coil 23 which, in combination with light beam irradiation, causes the data to be recorded to the optical disc 21B.

In the above setup, the microcomputer system 300 furnishes the system controller 120 with the address location to which to record the data on the optical disc 21B. The address given at this point is the real cluster number discussed earlier. That is, the data is recorded to the address location of the designated real cluster number.

Data is reproduced from the optical disc as follows: when the disc cartridge is loaded into the system, the system reads out data from the PTOC of the optical disc. The retrieved data is sent via the system controller 120 to the microcomputer system 300 for disc identification, i.e., to see if the loaded optical disc is of audio signal storage type or of data storage type. If the optical disc is found to be of data storage type, the data about the size of the recording and reproducing unit is read out from the UTOC of the disc, and the microcomputer system 300 identifies the unit size.

Once identified, the size of the data recording and reproducing unit remains unchanged until the optical disc is formatted anew. The UTOC of the optical disc 21B includes the contents of the data recorded on the disc as well as the information about where the data is located. With the contents of the recorded data displayed on the display unit of the microcomputer system 300, the user refers to the display and designates the retrieval of desired data.

After the user has designated desired data, the microcomputer system 300 refers to the recognized size of the data recording and reproducing unit as well as to the real cluster address of the data in the UTOC of the optical disc 21B, and issues an appropriate command to the data drive unit 100. In turn, the data drive unit 100 reproduces the corresponding data from the optical disc 21B as instructed.

Figure 19:
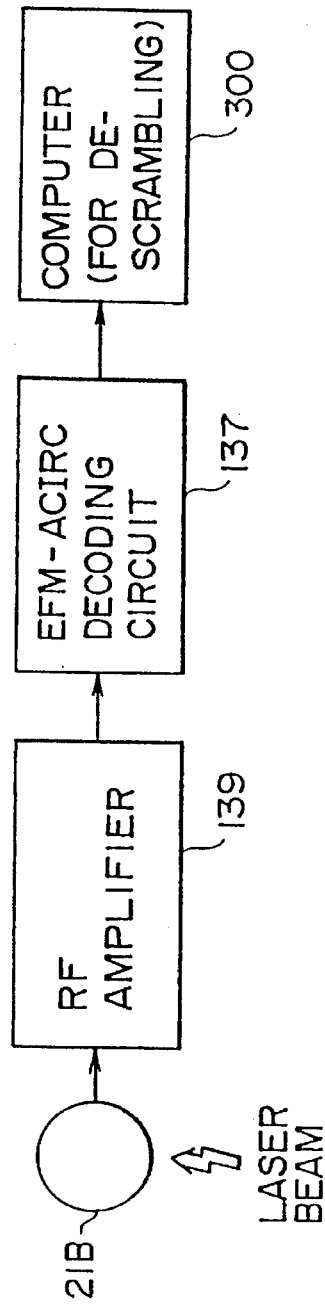
FIG. 19 is a block diagram showing the flow of data during data reproduction according to the invention.

The flow of data upon data reproduction is illustrated in FIG. 19. A light beam is irradiated to the appropriate address location on the optical disc 21B. The reflected light beam from the optical disc 21B is received by the light-receiving part 24D of the optical pickup 24. The output signal of the light-receiving part 24D is converted to an EFM signal by the RF amplifier 139. The EFM signal from the RF amplifier 139 is subjected to the EFM decoding and to the ACIRC error correction and decoding carried out by the decoding circuit 137.

The output data of the decoding circuit 137 is supplied to the microcomputer system 300 in which the drive controller 301 de-scrambles the received data. Where the data underwent error correction and encoding upon data recording, the error information E2PO is used at this point to correct correctable data whose error was not corrected using the ACIRC; the data whose error cannot be corrected even by use of the error information E2PO is again read out from the disc or otherwise dealt with. This completes the process of data reproduction from the optical disc 21B.

As many apparently different embodiments of this invention may be made without departing from the spirit and scope thereof, it is to be understood that the invention is not limited to the specific embodiments thereof except as defined in the appended claims.

What is claimed is:

1. An apparatus for reproducing digital data from a disc-shaped storage medium, the disc-shaped storage medium having recorded thereon a designated data reproducing unit size that is one of a plurality of possible reproducing unit sizes and the disc-shaped storage medium also having recorded thereon address information that includes repetitions of a plurality of sectors, comprising:

means for rotating the disc-shaped storage medium at a constant linear velocity;

means for reproducing the designated data reproducing unit size from the disc-shaped storage medium; and means for reproducing data from the disc-shaped storage medium in accordance with the address information and in increments of substantially the designated reproducing unit size such that each increment of data reproduced from the disc-shaped storage medium includes a plurality of sectors, including linking and data recording sectors, wherein the designated data reproducing unit size is not greater than the number of repeated sectors of address information.

2. A digital data reproducing apparatus according to claim 1, wherein the disc-shaped storage medium also has identification data previously recorded thereon in a protected manner, the identification data being read upon data reproduction from the disc-shaped storage medium to identify the type of the storage medium, and wherein the designated reproducing unit is read from a predetermined location of the disc-shaped recording medium only if the read-out identification data reveals that the disc-shaped storage medium is one having digital data recorded thereon.

3. A method of reproducing digital data from a disc-shaped storage medium, the disc-shaped storage medium having recorded thereon a designated data reproducing unit size that is one of a plurality of possible reproducing unit sizes and the disc-shaped storage medium also having recorded thereon address information that includes repetitions of a plurality of sectors, the method comprising:

rotating the disc-shaped storage medium at a constant linear velocity;

reproducing the designated data reproducing unit size from the disc-shaped storage medium; and reproducing data from the disc-shaped storage medium in accordance with the address information and in increments of substantially the designated reproducing unit size such that each increment of data reproduced from the disc-shaped storage medium includes a plurality of sectors, including linking and data recording sectors, wherein the designated data reproducing unit size is not greater than the number of repeated sectors of address information.

4. A digital data reproducing method according to claim 3, wherein the disc-shaped storage medium also has identification data previously recorded thereon in a protected manner, the identification data being read upon data reproduction from the disc-shaped storage medium to identify the type of the storage medium, and wherein the designated reproducing unit is read from a predetermined location of the disc-shaped recording medium only if the read-out identification data reveals that the disc-shaped storage medium is one having digital data recorded thereon.

* * * * *